(12) United States Patent
Hagano et al.

(10) Patent No.: US 6,197,858 B1
(45) Date of Patent: Mar. 6, 2001

(54) POLYAMIDE RESIN COMPOSITION AND FUEL TANK CAPS MADE OF THE SAME

(75) Inventors: Hiroyuki Hagano, Inazawa; Masayuki Nakagawa, Iwakura; Hideyuki Hisashi, Yokkaichi; Seiji Morimoto, Hiratsuka, all of (JP)

(73) Assignees: Toyoda Goesi Co., Ltd, Aichi-ken; Mitsubishi Chemical Corp., Tokyo, both of (JP)

( * ) Notice: Subject to any disclaimer, the term of this patent is extended or adjusted under 35 U.S.C. 154(b) by 0 days.

(21) Appl. No.: 09/217,531

(22) Filed: Dec. 21, 1998

(30) Foreign Application Priority Data

Dec. 24, 1997 (JP) ..................................................... 9-367163

(51) Int. Cl.[7] .............................. C08K 5/435; C08K 3/04; C08K 5/20; C08L 77/00
(52) U.S. Cl. .......................... 524/225; 524/496; 524/514; 252/511
(58) Field of Search ................................... 524/225, 496, 524/514; 252/511

(56) References Cited

U.S. PATENT DOCUMENTS

| | | | | |
|---|---|---|---|---|
| 4,899,521 | * | 2/1990 | Havens | 524/606 |
| 5,451,642 | * | 9/1995 | Abe et al. | 525/179 |
| 5,705,555 | * | 1/1998 | Guilfoy et al. | 524/496 |
| 5,747,164 | * | 5/1998 | Miyakawa et al. | 524/496 |

FOREIGN PATENT DOCUMENTS

| | | |
|---|---|---|
| 0218063 A1 | 4/1987 | (EP) . |
| 0754731 A2 | 1/1997 | (EP) . |
| 002098751 | 4/1977 | (JP) . |
| 002098750 | 6/1983 | (JP) . |
| 002098749 | 10/1987 | (JP) . |
| 02127567 | 5/1990 | (JP) . |
| WO 95/22579 | 8/1995 | (WO) . |

* cited by examiner

Primary Examiner—Tae Yoon
(74) Attorney, Agent, or Firm—Williams J. Sapone; Coleman Sudol Sapone, P.C.

(57) ABSTRACT

The present invention relates to a polyamide resin composition comprising a polyamide resin, a modified ethylene copolymer, an amide-based dispersant and an electroconductive material, said composition having not more than $10^{11}$ Ω·cm of an intrinsic volume resistivity and not less than 30 KJ/m$^2$ of an Izod impact strength measured according to ASTM D256.

14 Claims, 4 Drawing Sheets

POLYAMIDE RESIN COMPOSITION AND FUEL TANK CAPS MADE OF THE SAME

BACKGROUND OF THE INVENTION

The present invention relates to a polyamide resin composition and fuel tank caps made of the same. More particularly, it relates to a novel polyamide resin composition having excellent impact strength, electroconductivity and lightweight properties. This polyamide resin composition is useful for various articles such as fuel tank caps, hoses for solvents such as gasoline, various types of connectors, door handle parts, etc.

There are known the fuel tank caps of various structures for use in many fields of industry. FIG. 1 shows a sectional illustration of an ordinary type of cap used for the fuel tanks of automobiles.

The cap 2 shown in FIG. 1 principally comprises a resin-made closure 3 which fits on a fuel filler neck 1 which opens when feeding fuel and a resin-made shell 14 covering the upper part of the closure 3.

The closure 3 comprises a cylindrical portion 4 and a top plate 8 disposed so as to close the inner periphery of the cylindrical portion at its substantially middle position in the vertical direction and having an overflow opening 9 at the center. At the outer periphery of the lower part of the cylindrical portion 4 is formed a thread 5, to engage with the filler neck 1. At the outer periphery of the upper part of the cylindrical portion 4 is formed a flange 6 adapted to detain the resin-made shell 14 in position. Beneath the flange 6 is secured a seal ring 7.

A valve body 10 constituting a negative pressure valve is disposed on the lower side of the top plate 8 in the inside of the cylindrical portion 4. The valve body 10 is held in position by a holder plate 11 which is given an upward urge by a coiled spring 12 secured to a spring seat plate 13.

The cap 2 of the above construction is set in position as its resin-made closure 3 is fitted on the filler neck 1 disposed in its mounting hole 17 formed in a fixture 16 in a fuel lid 15 of an automobile. In FIG. 1, reference numeral 18 indicates the body of an automobile, 19 a fuel feed port, and 20 the chassis of the automobile.

The conventional fuel tank caps have no electroconductivity and are therefore incapable of discharging static electricity which may be charged on the human body or clothes every time when the cap is handled. In order to solve this static charge problem, attempts have been made to impart electroconductive properties to the caps by blending an electroconductive material such as carbon black or carbon whisker into a lightweight and high-strength polyamide resin.

These attempts still have the problem that when an electroconductive material such as carbon black necessary for imparting electroconductivity of not more than $10^{11}$ $\Omega \cdot cm$ (as volume resistivity) required for the fuel tank caps is blended in a basic polyamide resin, the melt viscosity of the resin composition increases, so that it Ls difficult to conduct its operation such as injection molding. Even if the molding operation could be performed, the molded product is deteriorated in its mechanical properties such as impact strength and hardly capable of attaining an Izod impact strength (ASTM D256) of not less than 30 $KJ/m^2$ required for the fuel tank caps.

It is known to blend a modified polyethylene copolymer in a polyamide resin to improve impact resistance.

However, there is yet available no impact-resistant electroconductive polyamide resin composition having satisfactory impact strength while maintaining electroconductivity required for the fuel tank caps by blending an electroconductive material such as carbon black and suite d for use as material of fuel tank caps.

As a result of the present inventors' earnest studies to solve the above problem, it has been found that a resin composition comprising a polyamide resin, a modified ethylene copolymer, an amide-based dispersant and an electroconductive material, shows satisfactory impact strength and electroconductivity. The present invention has been attained on the basis of the above finding.

SUMMARY OF THE INVENTION

The object of the present invention is to provide a polyamide resin composition which is light in weight and yet has a sufficient electroconductivity, a good molding workability, a high modulus of elasticity and a high impact strength, and its use as molding material for fuel tank caps in particular.

In order to attain the above object, in a first aspect of the present invention, there is provided a polyamide resin composition comprising a polyamide resin, a modified ethylene copolymer, an amide-based dispersant and an electroconductive material, the said composition having not more than $10^{11}$ $\Omega \cdot cm$ of an intrinsic volume resistivity and not less than 30 $KJ/cm^2$ of an Izod impact strength measured according to ASTM D256.

In a second aspect of the present invention, there is provided a fuel tank cap comprising an impact-resistant electroconductive polyamide resin composition comprising a polyamide resin, a modified ethylene copolymer, an amide-based dispersant and an electroconductive material, the said composition having a volume resistivity of not more than $10^{11}$ $\Omega \cdot cm$ and an Izod impact strength according to ASTM D256 of not less than 30 $KJ/m^2$.

In a third aspect of the present invention, there is provided a process for forming fuel tank caps, comprising using of an impact-resistant electroconductive polyamide resin composition comprising a polyamide resin, a modified ethylene copolymer, an amide-based dispersant and an electroconductive material, the said composition having not more than $10^{11}$ $\Omega \cdot cm$ of an intrinsic volume resistivity and not less than 30 $KJ/m^2$ of an Izod impact strength measured according to ASTM D256.

DETAILED DESCRIPTION OF THE INVENTION

The present invention is described in detail below.

Figure 1:
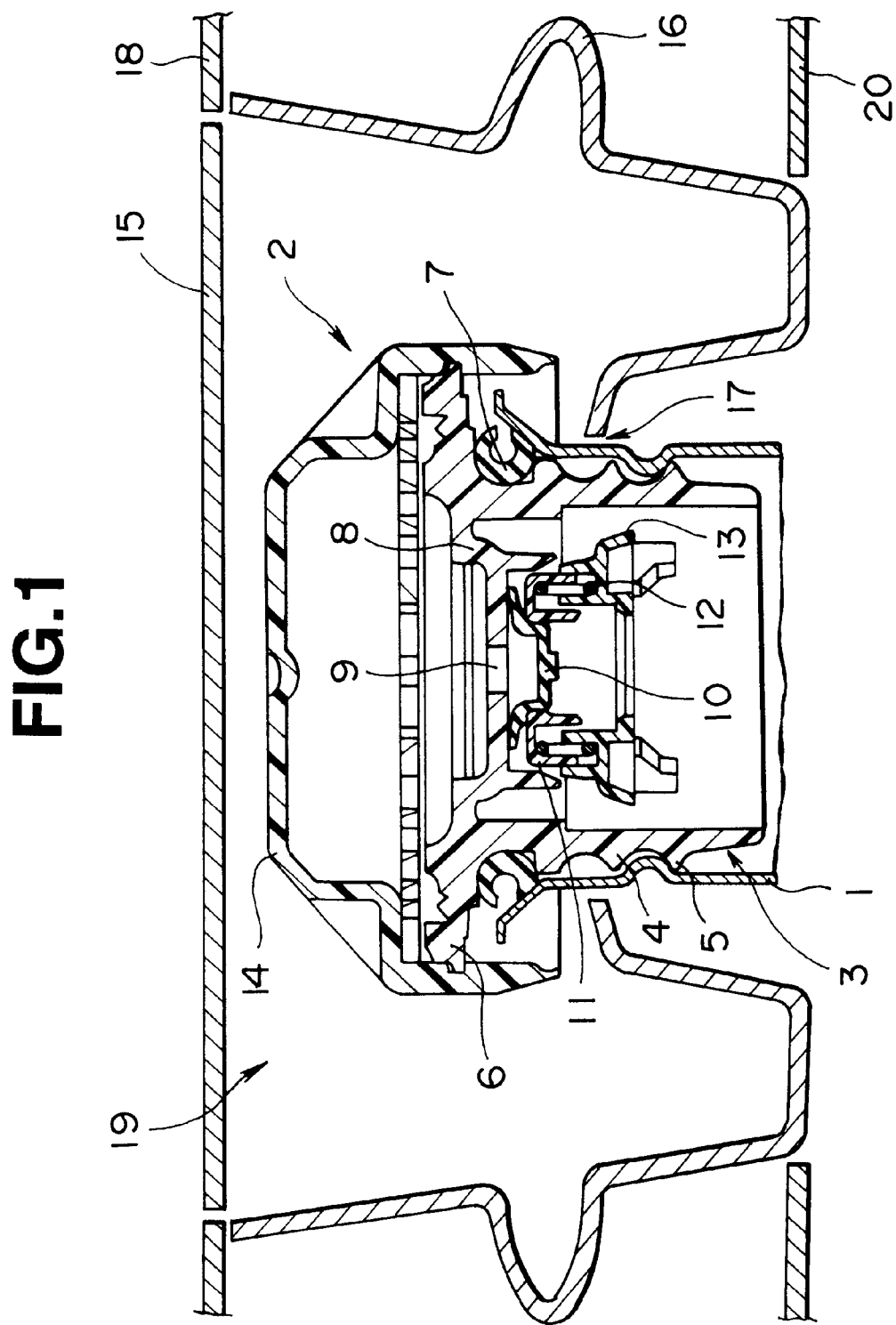
FIG. 1 is a sectional illustration of an example of ordinary caps for the fuel tanks of automobiles and others.

The fuel tank caps comprising a polyamide resin according to the present invention can be utilized for a variety of purposes in many fields of industry. The main feature according to the present invention lies in the composing material and, therefore, their structure and shape are not restricted. The fuel tank caps of the present invention is particularly useful for application to the fuel (gasoline) tanks of automobiles and the like. A typical example of the fuel tank caps for automobiles and the like comprises a resin-made closure designed to fit on a fuel filler neck and a resin-made shell covering the upper part of the said closure. An example of the structure of this type of a cap is illustrated in FIG. 1, which was briefly explained above.

In a fuel tank cap principally comprising a filler neck 1, a resin-made closure 3 designed to fit on the filler neck 1 and a resin-made shell 14, it is not necessary that both of the resin-made closure 3 and the resin-made shell 14 comprise the impact-resist electroconductive polyamide resin composition of the present invention which is described later; as far as at least the shell 14 is made of the said resin composition. However, in order to maximize the static electricity discharging function of the cap, it is preferable that both of the closure 3 and the shell 14 comprises the said resin composition.

Figure 2:
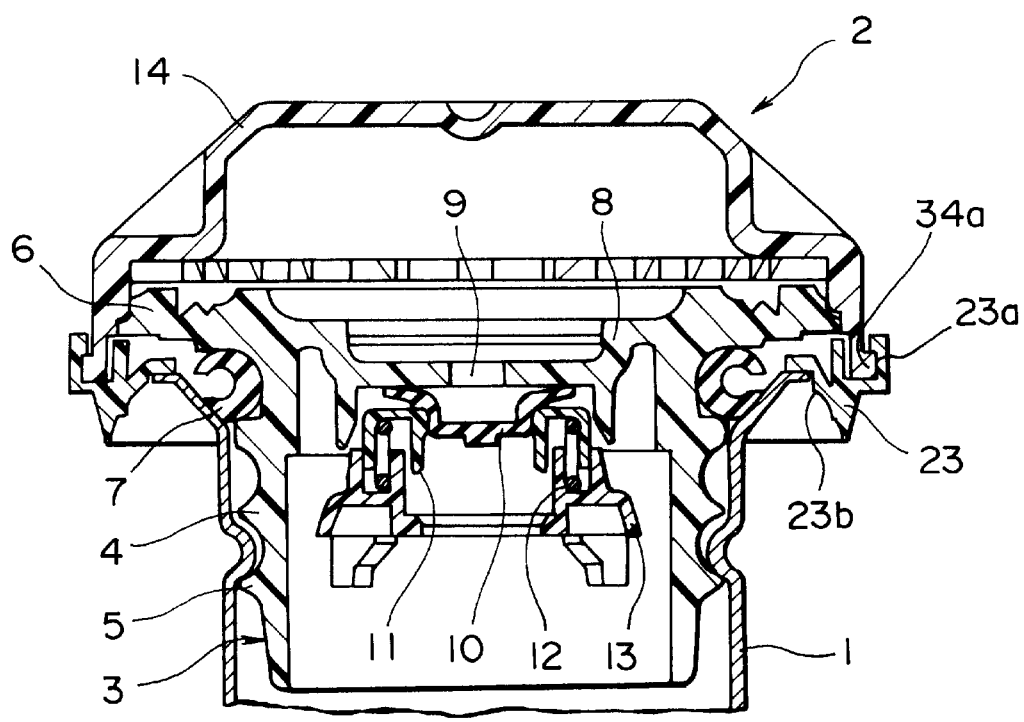
FIG. 2 is a sectional illustration of another example of caps for the fuel tanks of automobiles and others.
Figure 3:
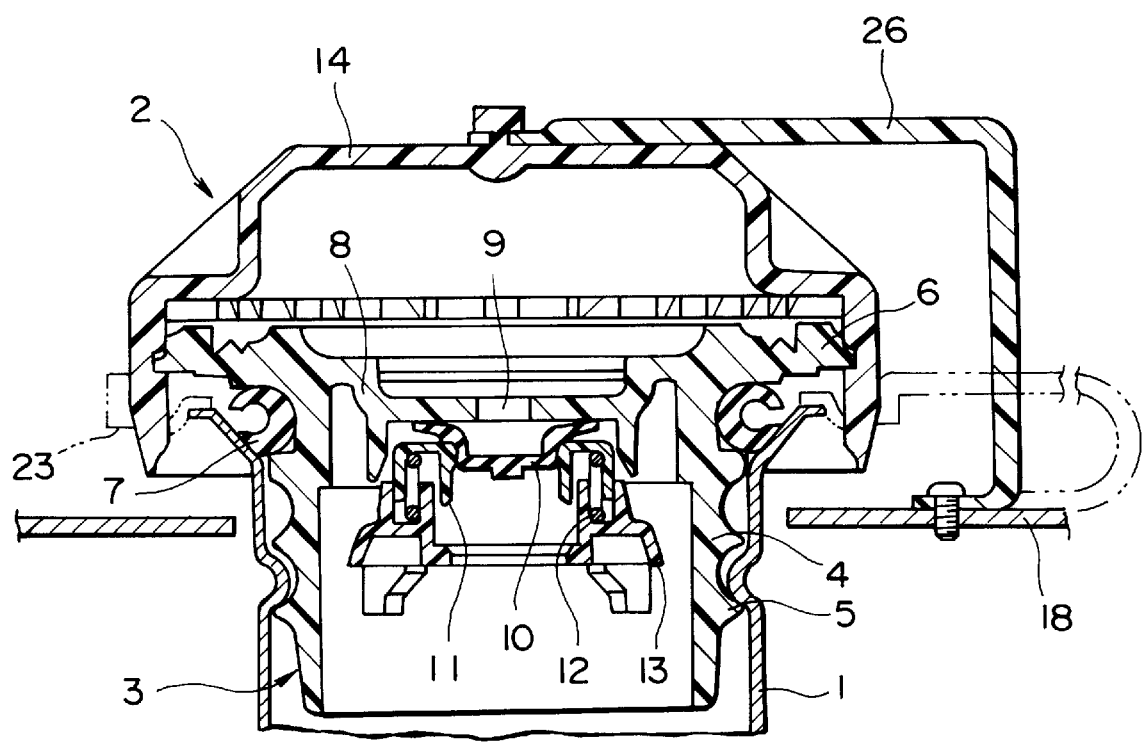
FIG. 3 is a sectional illustration of still another example of caps for the fuel tanks of automobiles and others.

Also, in the said fuel tank cap mainly comprising a resin-made closure 3 fitting on a filler neck 1 and a resin-made shell 14, it is preferable that the resin-made shell 14 be imparted with a static electricity discharging route. Such a discharge circuit is preferably established by making conductive the resin-made shell 14 and filler neck 1 or the chassis body 20. FIGS. 2 and 3 are the sectional illustrations of the other examples of the caps used for the fuel tanks of automobiles, etc., and these figures show the said static electricity discharge route. In the case of the discharge circuit shown in FIG. 2, the static electricity is discharged to the filler neck 1 through a retainer 23, and in the case of the discharge circuit shown in FIG. 3, the static electricity is discharged to the chassis body 20 through a string conductor 26. It is possible to effect discharge by connecting the retainer 23 and the string conductor 26 as shown by a dotted line in FIG. 3. In FIG. 2, reference numeral 23a indicates an internal engaging section, 23b a ring member, and 34a an external engaging section.

The feature of the fuel tank cap according to the present invention is to use a resin composition for producing the cap of the type described above, which resin composition comprises a polyamide resin, a modified ethylene copolymer, an amide-based dispersant and an electroconductive material, and has impact-resistant and electroconductive with a volume resistivity of not more than $10^{11}$ Ω·cm and an Izod impact strength (measured according to ASTM D256) of not less than 30 KJ/m$^2$. This polyamide resin composition also has a high bending modulus of usually not less than 10,000 as measured according to ASTM D790) and good moldability.

The polyamide resins usable in the present invention include nylons 4, 6, 7, 8, 11, 12, 6-6, 6-10, 6-11, 6-12, 6T, 6/6-6, 6/12, 6/6T, 6I/6T and the like. Nylon 6 is preferred in view of cost and impact resistance. The reduced viscosity (η rel) of the polyamide resin used in the present invention is preferably 2.2 to 3.5. If the reduced viscosity of the polyamide resin used is less than 2.2, the produced composition may be unsatisfactory in impact resistance. If the reduced viscosity exceeds 3.5, the fluidity of the composition may be deteriorated to impair its moldability. In the present invention, nylon 6 having a reduced viscosity of 2.2 to 3.5 is especially preferred for use as the polyamide resin.

The modified ethylene copolymer used in the present invention can be obtained by graft-polymerizing an α,β-unsaturated carboxylic acid or a derivative thereof to a copolymer of ethylene and an α-olefin having 3 or more carbon atoms (hereinafter referred to as "unmodified ethylene copolymer") in an amount of usually 0.05 to 1.5% by weight based on the unmodified ethylene copolymer.

The said unmodified ethylene copolymer can be obtained by copolymerizing ethylene of usually not less than 50 mol %, preferably 80 to 95 mol % with an α-olefin having 3 or more carbon atoms of usually not more than 50 mol %, preferably 20 to 5 mol % of in the presence of a Ziegler-Natta catalyst, preferably a vanadium compound such as vanadium oxytrichloride or vanadium tetrachloride and an organoaluminum compound. Examples of the α-olefins having 3 or more carbon atoms usable for the above copolymerization include propylene, butene-1, hexene-1, decene-1, 4-methylbutene-1, 4-methylpentene-1 and the like. Propylene or butene-1 is preferred.

Preferred examples of the unmodified ethylene copolymers usable for the said purpose include a series of resins commercially available under the trademark of "Tafmer" by Mitsui Petrochemical Co., Ltd., which include "Tafmer A" series (ethylene-butene-1 copolymers) such as "Tafmer A4085", "Tafmer A4090" and "Tafmer A20090", and "Tafmer P" series (ethylene-propylene copolymers) such as "Tafmer P0280", "Tafmer P0480", "Tafmer P0680" and "Tafmer P0880".

As the α,β-unsaturated carboxylic acid or a derivative thereof (hereinafter referred to as "unsaturated carboxylic acid") to be graft polymerized to the said unmodified ethylene copolymer, there can be used, for instance, acrylic acid, methacrylic acid, ethacrylic acid, maleic acid, fumalic acid and anhydrides or esters of these acids, of which maleic anhydride is preferred.

The amount of the unsaturated carboxylic acid to be grafted is usually 0.05 to 1.5% by weight, preferably 0.1 to 1% by weight based on the unmodified ethylene copolymer. If the amount of the unsaturated carboxylic acid is less than 0.05% by weight, the effect of improving impact resistance may be small and it may be impossible to obtain the molded products having a large tensile elongation. Also, because of poor compatibility with polyamides, the molded products tend to suffer surface exfoliation. The amount of the unsaturated carboxylic acid exceeds 1.5% by weight tends to cause tinting of the composition.

Graft polymerization is carried out by adding an unsaturated carboxylic acid to an unmodified ethylene copolymer, melting and kneading the mixture usually at a temperature of 150 to 300° C. according to the conventional methods. In carrying out this graft polymerization, an organic peroxide such as α,α'-bis-t-butylperoxy-p-diisopropylbenzene may be used to obtain a good yield of the polymerization. In this case, the amount of the organic peroxide used is usually 0.001 to 0.05% by weight based on the unmodified ethylene copolymer.

The degree of crystallinity of the modified ethylene copolymer used in the present invention is usually not more than 75%, preferably 1 to 35%, and the melt index thereof is usually within the range of 0.01 to 50, preferably 0.1 to 20. The above degree of crystallinity was determined according to the X-ray method described in Journal of Polymer Science, Vol. XVII (1955), pp. 17–26, and the melt index was determined according to the method of ASTM D-1238 57T at 190° C. The above-described modified ethylene copolymers can be obtained using the unmodified ethylene copolymers having a degree of crystallinity and a melt index within the above-defined ranges. The reduced viscosity of the modified ethylene copolymer is preferably 2.2 to 3.5. When the reduced viscosity of the said copolymer is less than 2.2, the produced composition tends to be unsatisfactorily low in impact strength, and when the reduced viscosity exceeds 3.5, fluidity of the composition tends to deteriorate to impair its moldability.

The amide-based dispersant used in the present invention is not specified, but N-alkylarylsulfoneamides, especially those represented by the following formula are preferably used.

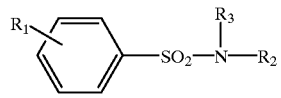

Where $R^1$ is a hydrogen atom or a lower alkyl group, $R^2$ is a lower alkyl group or a cycloalkyl group, and $R^3$ is a hydrogen atom, a lower alkyl group or a cycloalkyl group. The lower alkyl group is preferably $C_1$–$C_6$ alkyl group and the cycloalkyl group is preferably $C_6$–$C_{12}$ cycloalkyl group.

Examples of the N-alkylarylsulfoneamides represented by the above formula include N-n-butylbenzenesulfoneamide, N-n-propylbenzenesulfoneamide, N-ethylbenzenesulfoneamide, N-cyclopentylbenzenesulfoneamide, N-cyclohexylbenzenesulfoneamide, N-n-butyltoluenesulfoneamide, N-cyclohexyltoluenesulfoneamide, N,N'-dimethylbenzenesulfoneamide, N,N'-diethylbenzenesulfoneamide, N,N'-dipropylbenzenesulfoneamide, N,N'-di-n-butylbenzenesufoneamide, N,N'-methylethylbenzenesulfoneamide, N,N'-methylpropylbenzene-sulfoneamide, and N,N'-ethylpropylbenzenesulfoneamide.

As the electroconductive material in the present invention, carbon black, electroconductive potassium titanate whisker, carbon whisker and the like can be preferably used. Carbon black is more preferred.

As the said electroconductive potassium titanate whisker, any type thereof can be used provided that the surfaces of the potassium titanate whiskers of the formula: $K_2O.nTiO_2$, have been subjected to an electroconductive treatment, but the white whiskers coated with tin oxide or antimony oxide or the black whiskers obtained by depositing carbon on the surfaces of the potassium titanate whiskers are preferably used. Specifically, a commercial product available under the trade name of "Dentall" by Otsuka Chemical Co., Ltd. can be used.

As for the carbon black used in the present invention, various types of carbon black which are shown in "Handbook of Carbon Black, 3rd Ed." published by the Japan Carbon Black Association in 1995, and have a total amount of oxygen from volatiles of not more than 25 mg/g and a UV absorbance of not more than 0.15, are preferably used.

A preferred method for obtaining such carbon black having good electroconductivity comprises heat-treating furnace black with a total pre-treatment amount of oxygen of not more than 50 mg/g, preferably not more than 20 mg/g, under an inert atmosphere to reduce the total amount of oxygen. The term "inert atmosphere" herein means an atmosphere where there exist no oxygen molecules, or if they exist, their compositional percentage is very low. Specifically, an atmosphere comprising argon, nitrogen, carbon dioxide or such is preferred. The temperature for the heat treatment is preferably 200 to 700° C. When the temperature is less than 200° C., it may be hardly possible to eliminate the oxygen functional groups. When the temperature exceeds 700° C., there may take place thermal shrinking of the carbon black particle surfaces as well as the aggregates or agglomerates of the particles, so that by the hardening of the agglomeration units, their dispersibility in the resin may be deteriorated. The heat-treating time, although variable depending on the atmosphere temperature, is preferably about 15 minutes to 10 hours.

The oxygen functional groups such as hydroxyl groups or carbonyl groups exist in the carbon black particle surfaces, and the amount of such functional groups greatly affects resistance when such carbon black is blended in a resin. Usually, the amount of the oxygen functional groups is determined from the volatile composition, the amount of hydroxyl or carbonyl groups from CO, and the amount of carboxylyl groups from $CO_2$, and the total amount of oxygen is calculated from CO and $CO_2$.

The said volatile composition can be determined in the following way. First, a preliminarily determined amount of dry carbon black is put into a heat-resistant test tube, evacuated to 10 to 2 mmHg, and then set in a 1,500° C. electric furnace, allowing elimination of the volatiles for 30 minutes. Then the whole amount of the eliminated components are collected and mixed in a tank, and gas-chromatograph measured thereof is conducted to determine the gas composition and the amounts of its components. The total amount of oxygen (total oxygen) is calculated from the results of the above determinations.

Carbon black is a carbonaceous material which is infinitely close to the condition of purity, but by fine analysis thereof, the materials which are carbon black precursors such as pyrene, naphthalene and fluoranthene are present on the surfaces or the inside of the particles. The amounts of these materials can be known by determining ultraviolet absorbance, in the following way for instance. First, 3.00 g of carbon black is supplied into a Erlenmeyer flask, then 30 ml of toluene is added thereto, and the mixed solution is shaken for 60 seconds and then passed through a filter paper (either of the two types specified in JIS P3801). Then the filtrate is put into a flow cell and absorbance at the measuring wavelength of 336 nm is measured. The higher the absorbance, the more the amounts of the precursors increase.

According to V. E. Gool et al (Study of Electroconductive Polymers and Their Application, 1970), it is considered that the transfer of electric charge necessary for causing flow of electricity takes place mostly on the surfaces of the chains constituted by the filler particles and in the particles by using radiant heat. The oxygen functional groups present on the carbon black surface and the carbon black precursors such as pyrene determined by UV absorbance are the materials which obstruct the transfer of electric charges, and it is considered that the more the amount of such materials, the more the electroconductivity worsens. As a result of various studies based on the above conception, it was found that the carbon black with a total amount of oxygen of not more than 25 mg/g and a UV absorbance of not more than 0.15 mg is an electroconductive material especially preferred for the purpose of the present invention.

In the present invention, although one type of carbon black may be used, it is preferred to use a combination of two or more types of carbon black having a different specific surface of not less than 500 m²/g from each other for the following reason.

Generally, carbon black having a high specific surface area is produced by subjecting the base carbon black to activation or other treatments, and in such carbon black many pores are present in the surface and the inside of the particles. In carbon black having a large number of such pores, the number of the carbon black particles per unit weight is large, so that in a resin matrix where a prescribed amount of carbon black was blended, the frequency of contact between the carbon black particles is high, and hence a resin matrix having a composition of low resistance is obtained. On the other hand, since such carbon black adsorbs the low-molecular weight materials and dispersant blended in the resin, it tends to deteriorate the properties other than electroconductivity of the composition. Quite surprisingly, however, it has been found that a system comprising 10 to 60 wt % of carbon black of high specific surface area and 40 to 90 wt % of carbon black of low specific surface area derives only the good properties of both types of carbon black.

The impact-resistant electroconductive polyamide resin composition for fuel tank caps according to the present invention comprises a blend of the said types of polyamide resin, modified ethylene copolymer, amide-based dispersant and electroconductive material. The blending method and the amounts of the respective components to be blended are not specifically defined as far as satisfying the requirement that the obtained resin composition has a volume resistivity of not more than $10^{11}$ Ω·cm and an Izod impact strength (measured according to ASTM D256) of not less than 30 KJ/m$^2$. But, the following procedures are preferred.

Generally, the content of the modified ethylene copolymer is 10 to 120 parts by weight based on 100 parts by weight of the polyamide resin. The amount of the amide-based dispersant in the whole composition is 1 to 15% by weight based on the weight of the impact-resistant electroconductive polyamide composition, and the amount of the electroconductive material in the whole composition is 8 to 35% by weight based on the weight of the impact-resistant electroconductive polyamide composition.

If the amount of the amide-based dispersant is less than 1% by weight, sufficient kneading may not be attained especially for a blend system required for such a conductive composition where carbon black is blended in a high content, and consequently, it may become difficult to obtain such a resin composition with good dispersibility and high electroconductivity. On the other hand, if the percentage of the amide-based dispersant exceeds 15% by weight, the content of carbon black to the resin becomes high excessively to adversely affect impact resistance of the composition. The preferred amount of the amide-based dispersant is 3 to 10% by weight.

If the amount of the electroconductive material is less than 8% by weight, antistatic properties of the composition tend to deteriorate, and if the amount exceeds 35% by weight, the kneading operation may become hard to conduct normally, and it also may become difficult to maintain preferred fluidity and mechanical strength of the composition. The preferred percentage of the electroconductive material is 10 to 30% by weight based on the weight of the impact-resistant electroconductive polyamide composition.

In case where a modified ethylene copolymer containing propylene as repeating units is used, the content of the propylene-containing modified ethylene copolymer is preferably 10 to 40 parts by weight based on 100 parts by weight of the polyamide resin, the amount of the amide-based dispersant in the whole composition is preferably 1 to 15% by weight, and the amount of the electroconductive material in the whole composition is preferably 8 to 35% by weight.

In case where a modified ethylene copolymer containing butene-1 as repeating units is used, the content of the butene-1-containing modified ethylene copolymer is preferably 50 to 120 parts by weight based on 100 parts by weight of the polyamide resin, the amount of the amide-based dispersant in the whole composition is preferably 1 to 15% by weight, and the amount of the electroconductive material in the whole composition is preferably 8 to 35% by weight.

In case both of the said propylene-containing modified ethylene copolymer and butene-1-containing modified ethylene copolymer are used, the content of propylene-containing modified ethylene copolymer is preferably 10 to 40 parts by weight based on 100 parts by weight of the polyamide resin, the content of the butene-1-containing modified ethylene copolymer is preferably 50 to 120 parts by weight based on 100 parts by weight of the polyamide resin, the amount of the amide-based dispersant in the whole composition is preferably 1 to 15% by weight, and the amount of the electroconductive material in the whole composition is 8 to 35% by weight.

In either case, it is preferable that the matrix resin is an impact-resistant polyamide resin modified by a modified ethylene copolymer. Especially, an impact-resistant polyamide resin modified by a propylene-containing modified ethylene copolymer has an excellent modulus of elasticity that can never be obtained with an impact-resistant polyamide resin modified by a butene-1-containing modified ethylene copolymer, It is particularly preferable that the matrix resin comprises (A) an impact-resistant polyamide resin comprising a blend of a polyamide resin and a propylene-containing modified ethylene copolymer, and (B) an irmpact-resistant polyamide resin comprising a blend of a polyamide resin and a butene-1-containing modified ethylene copolymer. This matrix resin is capable of providing high electroconductivity relative to the percentage of the electroconductive material (especially carbon black). In this case, the content of the impact-resistant polyamide resin (A) in the matrix resin is preferably 70 to 90% by weight, and the content of the impact-resistant polyamide resin (B) is preferably 5 to 30% by weight, because this proportion provides a good balance of modulus and impact strength of the composition.

The impact-resistant electroconductive polyamide resin composition for fuel tank caps according to the present invention can be produced by a method in which a mixture of the components dry-blended by a Henschel mixer or other preferable means is continuously kneaded by a known single- or twin-screw kneader and pelletized. In the composition of the present invention, one or more of the ordinarily used additives, for example, ultraviolet absorber (such as benzophenone), antioxidant, heat stabilizer (such as hindered phenol) and crystallization promotor (such as polyethylene glycol) may be added as required within limits not prejudicial to the object of the present invention.

As described above, the polyamide resin composition of the present invention shows excellent mechanical properties such as tensile modulus, bending modulus and Izod impact strength as well as a good molding workability. The fuel tank caps molded from the polyamide composition of the present invention are capable of discharging static electricity charged on the human body or clothes, with certainty within a given period of time.

EXAMPLES

The present invention is further illustrated by the following examples, which examples however are merely intended to be illustrative and not to be construed as limiting the scope of the invention. In the following Examples, all "parts" and "percents (%)" are by weight unless otherwise noted. The property evaluations in the Examples were made by the following methods.

(1) Bending modulus (bending strength): ASTM D790
(2) Izod impact strength: ASTM D256
(3) Volume resistivity (surface resistivity)

An injection molded 10 cm×10 cm×2 mm thick plate was set in a resistivity measuring cell mfd. by Yokokawa Hewlet Packard, Ltd., and its resistivity was measured. Resistivity above $10^5$ Ω was measured using High Resistance Meter mfd. by Yokokawa Hewlet Packard, Ltd., at an applying voltage of 500 V, and resistivity not more than $10^6$ Ω was measured using Digital Multimeter mfd. by Advantest Co., Ltd.

Production of Resin Composition

Example 1

Production of Modified Polyethylene Polymers 0.02 part of α,α-bis-1-butylperoxy-p-diisopropylbenzene and 0.4 part of maleic anhydride were added to 100 parts of an ethylene-propylene copolymer having a degree of crystallinity of 5% and a melt index (ML) of 0.35, and mixed by a Henschel mixer, and the mixture was kneaded by a 35 mm φ single-screw kneader at 230° C. and pelletized to obtain a modified polyolefin copolymer (hereinafter called modified polyethylene A).

Meanwhile, 0.025 part of α,α-bis-1-butylperoxy-p-diisopropylbenzene and 0.8 part of maleic anhydride were added to 100 parts of an ethylene-butene-1 copolymer having a degree of crystallinity of 20%, MI of 3.6 and a butene-1 content of 14 mol %, and mixed by a Henschel mixer, and the mixture was treated as described above to obtain a modified polyolefin copolymer (hereinafter called modified polyethylene B).

Production of Impact-resistant Polyamide Resins

20% of the said modified polyethylene A and small quantities (less than 1%) of the additives such as antioxidant and dispersant were blended with 80% of a nylon 6 resin (tradename: Novamide 1020) produced by Mitsubishi Engineering-Plastics Corporation and the blend was kneaded by the said kneader to obtain an impact-resistant polyamide resin A (hereinafter called impact-resistant resin A).

Meanwhile, 45% of the said modified polyethylene B and small quantities of additives such as antioxidant and dispersant were blended with 55% of a nylon 6 resin (trade name: Novamide 1010J) produced by Mitsubishi Engineering Plastics Corporation and the blend was kneaded by the said kneader to obtain an impact-resistant polyamide resin B (hereinafter called impact-resistant resin B).

Production of Carbon Black 500 g of furnace carbon black having a specific surface area of 40 $m^2/g$, DBP absorption of 175 ml/100 g, a pH of 6.3, a volatile component of 1.80%, a total oxygen content of 30.6 mg/g and UV absorbance of 0.18, was put into a 30 cmφ, 50 cm long cylindrical SUS kiln and the latter was rotated at a speed of 10 rpm. Nitrogen gas was introduced into the kiln from its central part at a rate of 10 1/min, and after the whole inside of the kiln has been perfectly substituted with $CO_2$, heating was started. Heating was conducted using an electric furnace covering the entire kiln for a period of 6 minutes while controlling it so that the carbon black temperature would reach 350±5° C. The properties of the obtained carbon black are shown in Table 1.

TABLE 1

| Properties of carbon black | |
|---|---|
| DBP | 175 ml/100 g |
| Specific surface area (measured by BET method) | 43 $m^2/g$ |
| PH | 6.9 |
| Volatiles | 0.57% |
| Total oxygen | 10.4 mg/g |
| UV absorbance | 0.09 |

Production of Electroconductive Composition

22% of the carbon black having the properties shown in Table 1 and 5% of N-n-butylbenzenesulfoneamide (trade name: BBSA, produced by Toray Corp.) were blended with 58.4% of the impact-resistant resin A and 14.6% of the impact-resistant resin B. and mixed for 10 minutes by a Henschel mixer (1,000 rpm).

Each mixture was kneaded by Toshiba Machinery kneader TEM-35 having a screw diameter of 35 mm under the conditions of kneading section temperature=275° C., resin temperature=270° C. and feed rate=4 kg/h, and the obtained strand was cooled with water and pelletized. The pellets were dried by a vacuum dryer at 70° C. for 12 hours and subjected to the following injection molding.

The said pellets were injection molded by Japan Steel Works injection molder J-75ED under the conditions of cylinder temperature=280° C., mold temperature=80° C., screw speed=120 rpm and injection pressure=1,039 $kg/m^2$ to obtain the test pieces for evaluation. The results of the various property evaluations are shown in Table 3.

Example 2

The same procedure as defined in Example 1 was conducted except that the amount of the resin blended was changed to 65%, the amount of carbon black was changed to 30% and the amount of BBSA was changed to 5% to obtain the test pieces for evaluation. The results of the evaluation tests are shown in Table 3.

Example 3

The same procedure as defined in Example 1 was conducted except that the amount of the impact-resistant resin A blended was changed to 65.7% and the amount of the impact-resistant resin B was changed to 7.3% to obtain the test pieces for evaluation. The results of the evaluation tests are shown in Table 3.

Example 4

The same procedure as defined in Example 1 was conducted except that Koechen Black International carbon black Koechen Black EC having the properties shown in Table 2 were used in an amount of 9.5% to obtain the test pieces for evaluation. In this example, the amount of the resin blended was 85.5% and the amount of BBSA 5%. The results of the evaluation tests are shown in Table 3.

TABLE 2

| Properties of carbon black | |
|---|---|
| DBP | 360 ml/100 g |
| Specific surface area | 800 m$^2$/g |
| PH | 9.0 |
| Volatiles | 0.5% |
| Total oxygen | 22.3 mg/g |
| UV absorbance | 0.11 |

Example 5

The same procedure as defined in Example 1 was conducted except that two types of carbon black, namely 17.6% of carbon black used in Example 1 and 4.4% of carbon black used in Example 4 (totaling 22%) were used to obtain the test pieces for evaluation. The results of the evaluation tests are shown in Table 3.

Example 6

The same procedure as defined in Example 1 was conducted except that the amount of the impact-resistant resin A was changed to 43.8% and the amount of the impact-resistant resin B was changed to 29.2% to obtain the test pieces for evaluation. The results of the evaluation tests are shown in Table 3.

Example 7

The same procedure as defined in Example 1 was conducted except that the impact-resistant resin A alone was blended in an amount of 73% to obtain the test pieces for evaluation. The results of the evaluation tests are shown in Table 3.

Comparative Example 1

The same procedure as defined in Example 1 was conducted except that the impact-resistant resin A alone was used in an amount of 73% to obtain the test pieces for evaluation. The results of the evaluation tests are shown in Table 3.

Comparative Example 2

The same procedure as defined in Example 1 was conducted except that an impact-resistant polyamide resin C obtained by mixing 20% of the said modified polyethylene B and small quantities of the additives such as antioxidant and dispersant with 7.3% of the impact-resistant resin A and 80% of Du Pont nylon 66 "FE-3218" and kneading the mixture by the said kneader was blended in an amount of 65.7%. The results of the evaluation tests are shown in Table 3.

TABLE 3

|  | Bending modulus | Izod impact strength | Surface resistivity |
|---|---|---|---|
| Example 1 | 14500 | 46 | 1.1 × 10$^9$ |
| Example 2 | 14000 | 41 | 6.3 × 10$^2$ |
| Example 3 | 17100 | 46 | 2.8 × 10$^9$ |
| Example 4 | 14400 | 42 | 7.3 × 10$^6$ |
| Example 5 | 14100 | 43 | 8.2 × 10$^3$ |
| Example 6 | 11500 | 48 | 8.9 × 10$^9$ |
| Example 7 | 18600 | 38 | 5.6 × 10$^{10}$ |
| Comparative Example 1 | 7570 | 29 | 9.3 × 10$^9$ |
| Comparative Example 2 | 18500 | 8 | 1.3 × 10$^9$ |

Manufacture of Fuel Tank Caps

Examples 8–14

A resin-made closure and a resin-made shell of a fuel tank cap (see FIG. 1) principally comprising a resin-made closure fitting on a filler neck and a resin-made shell were injection molded under the conditions shown in Table 4 below using the pellets of each of the impact-resistant electroconductive polyamide resin compositions obtained in Examples 1–7.

TABLE 4

| Resin temperature | 275° C. |
|---|---|
| Mold temperature | 40° C. |
| Injection pressure | 50 kg/cm$^2$ |
| Injection time | 1 hour |
| Dwell pressure | 60 kg/cm$^2$ |
| Retention time | 6 seconds |

Figure 4:
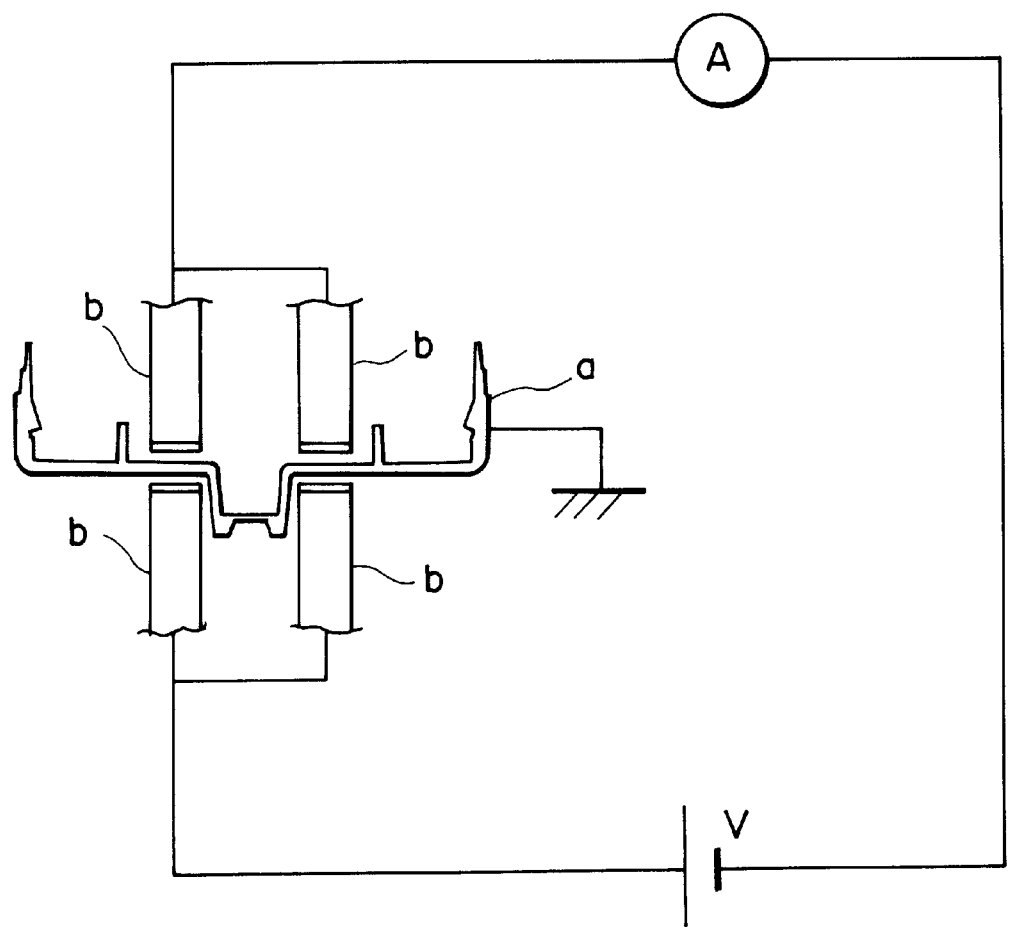
FIG. 4 is an illustration of the method of measurement of volume resistivity of a resin-made shell (outer shell) according to ASTM D257.

Volume resistivity of the resin-made shell (outer shell) was measured according to ASTM D257 in the following way: As shown in FIG. 4, each outer shell (a) was held between the opposing electrodes (b) having attached to their ends an electroconductive rubber sheet with resistance of not more than 100 Ω, then a high resistance meter (mfd. by Advantest Co., Ltd.) was connected to the electrodes and volume resistivity of the shell was measured by applying a voltage of 500 V. The results show that the outer shells molded from the pellets of the impact-resistant electroconductive polyamide resin compositions obtained in Examples 1 to 7 had sufficient volume resistivity for practical use as a member of the fuel caps.

What is claimed is:

1. A fuel tank cap comprising an impact-resistant electroconductive polyamide resin composition comprising a polyamide resin, a modified ethylene copolymer, an amide-based dispersant and an electroconductive material, said composition having a volume resistivity of not more than 10$^{11}$ Ω·cm and an Izod impact strength according to ASTM D256 of not less than 30 KJ/m$^2$.

2. A fuel tank cap according to claim 1, which further comprises a resin-made closure fitted on a fuel filler neck and a resin-made shell covering the upper part of said closure, and having a static electricity discharge route, wherein at least said shell comprises the polyamide resin compositions as defined in claim 1.

3. A fuel tank cap according to claim 2, wherein both of the resin-made closure and the resin-made shell comprises the polyamide resin compositions as defined in claim 1.

4. A fuel tank cap according to claim 1, wherein the polyamide resin is nylon 6.

5. A fuel tank cap according to claim 4, wherein the reduced viscosity of the nylon 6 as defined by η rel is 2.2 to 3.5.

6. A fuel tank cap according to claim 1, wherein the modified ethylene copolymer is the one containing propylene as repeating units, the one containing butene-1 as repeating units or mixture thereof.

7. A fuel tank cap according to claim 1, wherein the amide-based dispersant is N-alkylarylsulfoneamide.

8. A fuel tank cap according to claim 1, wherein the electroconductive material is carbon black.

9. A fuel tank cap according to claim 8, wherein the carbon black has a total amount of oxygen from the volatiles of not more than 25 mg/g and a UV absorbance of not more than 0.15.

10. A fuel tank cap according to claim 9, wherein the carbon black is a combination of at least two carbon blacks having a difference in specific surface area of not less than 500 m$^2$/g.

11. A fuel tank cap according to claim 1, wherein the content of the modified ethylene copolymer is 10 to 120 parts by weight based on 100 parts by weight of the polyamide resin, the amount of the amide-based dispersant composition is 1 to 15% by weight based on the total composition, and the amount of the electroconductive material is 8 to 35% by weight based on the total composition.

12. A fuel tank cap according to claim 1, wherein the modified ethylene copolymer is the one containing propylene as repeating units, and the content of the propylene-containing modified ethylene copolymer is 10 to 40 parts by weight based on 100 parts the polyamide resin, the amount of the amide-based dispersant composition is 1 to 15% by weight based on the total composition, and the amount of the electroconductive material is 8 to 35% by weight based on the total composition.

13. A fuel tank cap according to claim 1, wherein the modified ethylene copolymer is the one containing butene-1 as repeating units, and the content of the butene-1-containing modified ethylene copolymer is 10 to 40 parts by weight based on 100 parts the polyamide resin, the amount of the amide-based dispersant composition is 1 to 15% by weight based on the total composition, and the amount of the electroconductive material is 8 to 35% by weight based on the total composition.

14. A process for forming fuel tank caps, comprising using of an impact-resistant electroconductive polyamide resin composition comprising a polyamide resin, a modified ethylene copolymer, an amide-based dispersant and an electroconductive material, said composition having not more than $10^{11}$ Ω·cm of an intrinsic volume resistivity and not less than 30 KJ/m$^2$ of an Izod impact strength measured according to ASTM D256.

* * * * *